United States Patent
Yang et al.

(10) Patent No.: US 10,411,272 B2
(45) Date of Patent: Sep. 10, 2019

(54) OPTIMIZATION OF TUNNEL LOCATION FOR UNIFORM CONTACT PRESSURE DISTRIBUTION

(71) Applicant: GM Global Technology Operations LLC, Detroit, MI (US)

(72) Inventors: Xi Yang, Bloomfield Hills, MI (US); Siguang Xu, Rochester Hills, MI (US); Liang Xi, Northville, MN (US)

(73) Assignee: GM Global Technology Operations LLC, Detroit, MI (US)

(*) Notice: Subject to any disclaimer, the term of this patent is extended or adjusted under 35 U.S.C. 154(b) by 270 days.

(21) Appl. No.: 15/299,802

(22) Filed: Oct. 21, 2016

(65) Prior Publication Data
US 2018/0114991 A1    Apr. 26, 2018

(51) Int. Cl.
*H01M 8/0265*    (2016.01)
*H01M 8/026*    (2016.01)
*H01M 8/04082*    (2016.01)
*H01M 8/0247*    (2016.01)
*H01M 8/0258*    (2016.01)

(52) U.S. Cl.
CPC ......... *H01M 8/0265* (2013.01); *H01M 8/026* (2013.01); *H01M 8/0247* (2013.01); *H01M 8/0258* (2013.01); *H01M 8/04201* (2013.01)

(58) Field of Classification Search
CPC .................... H01M 8/0263; H01M 8/0265
See application file for complete search history.

(56) References Cited

U.S. PATENT DOCUMENTS

| | | | |
|---|---|---|---|
| 6,490,778 B1 * | 12/2002 | Funatsu | B21C 37/02 29/557 |
| 8,535,845 B2 | 9/2013 | Rock et al. | |
| 2009/0197147 A1 | 8/2009 | Fly et al. | |
| 2011/0229788 A1 * | 9/2011 | Reinert | H01M 8/0206 429/457 |

* cited by examiner

*Primary Examiner* — Olatunji A Godo
(74) *Attorney, Agent, or Firm* — Quinn IP Law

(57) ABSTRACT

A number of variations may include at least one bipolar plate which may include at least one bead, the bead may include a plurality of crest portions and a plurality of trough portions having at least one tangent portion disposed between adjacent crest portions and trough portions; the bipolar plate further may include at least one tunnel defining at least one through hole within the at least one tangent portion.

18 Claims, 2 Drawing Sheets

OPTIMIZATION OF TUNNEL LOCATION FOR UNIFORM CONTACT PRESSURE DISTRIBUTION

TECHNICAL FIELD

The field to which the disclosure generally relates includes bipolar plates.

BACKGROUND

Bipolar plates may be used in, for example, fuel cell stacks which may include a sealing bead or sealing beads in parallel and a plurality of through-tunnels. Sealing beads may militate against fluid leakage from adjacent plates within a fuel cell stack and facilitate flow of reactants within the fuel cell stack. Bead contact pressure between adjacent bipolar plates varies depending on features of the bead and location of adjacent tunnels.

SUMMARY OF ILLUSTRATIVE VARIATIONS

A number of variations may include at least one bipolar plate which may include at least one bead, the bead may include a plurality of crest portions and a plurality of trough portions having at least one tangent portion disposed between adjacent crest portions and trough portions; the bipolar plate further may include at least one tunnel defining at least one through hole within the at least one tangent portion.

A number of variations may include a fuel cell assembly including at least one bipolar plate which may include at least one bead, the bead may include a plurality of crest portions and a plurality of trough portions having at least one tangent portion disposed between adjacent crest portions and trough portions; the fuel cell assembly further may include at least one tunnel defining at least one through hole within the at least one tangent portion.

A number of variations may include a method that may include providing a fuel cell assembly which may include at least one bipolar plate including at least one bead, the bead may include a plurality of crest portions and a plurality of trough portions having at least one tangent portion disposed between adjacent crest portions and trough portions; and reducing contact pressure distribution on the at least one bipolar plate which may include at least one bead by defining at least one tunnel defining at least one through hole within the at least one tangent portion.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Figure 1:
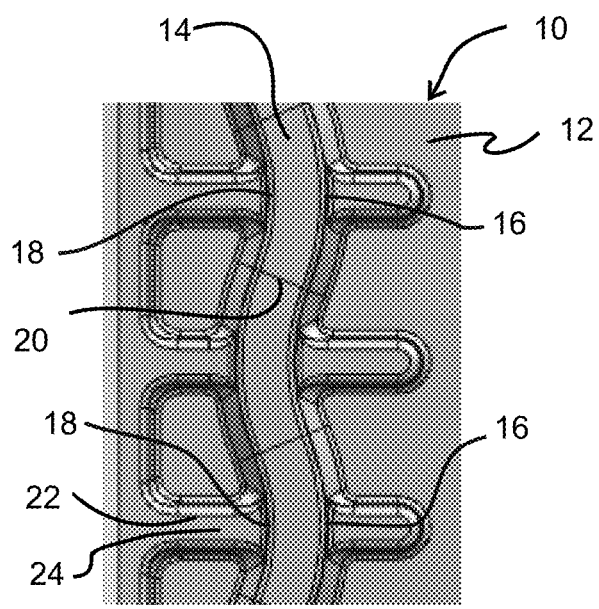
FIG. 1 depicts one variation of a fuel cell assembly.
Figure 2:
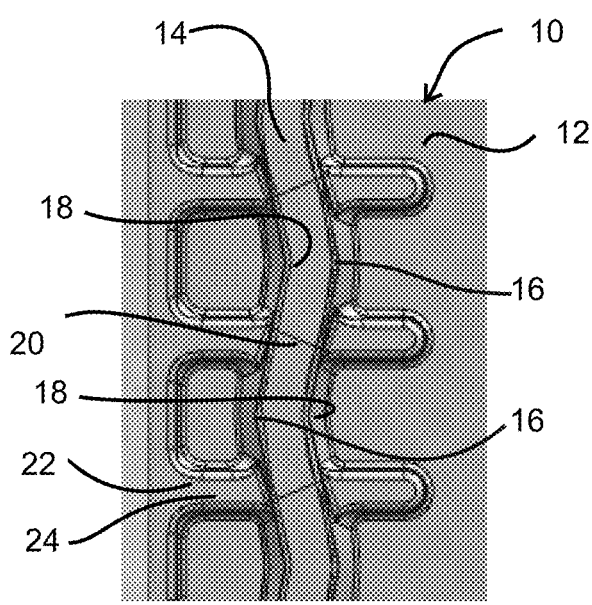
FIG. 2 depicts one variation of a fuel cell assembly.

FIGS. 1 and 2 depict variations of a product including a fuel cell assembly 10 including at least one bipolar plate 12. A raised bead 14 may be defined on or by the bipolar plate 12 and may be generally sinusoidal in shape or may be generally zig-zag in shape. The bead 14 may include a plurality of crest portions 16 opposite a plurality of trough portions 18, having a plurality of tangent portions 20 disposed between adjacent crest portions 16 or adjacent trough portions 18. A plurality of tunnels 22 may be formed within the crest portions 16, the trough portions 18, or tangent portions 20 and may define a plurality of through holes 24. The fuel cell assembly 10 may be constructed and arranged to reduce contact pressure distribution on the at least one bipolar plate 12 including the bead 14 by defining at least one tunnel 22 defining at least one through hole 24 within the at least one tangent portion 20.

Figure 3:
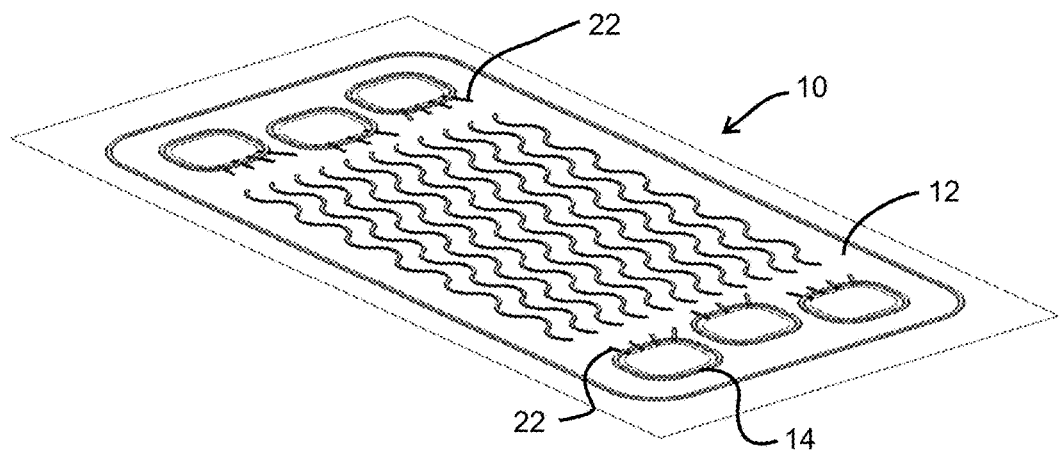
FIG. 3 depicts one variation of a fuel cell assembly.
Figure 4:
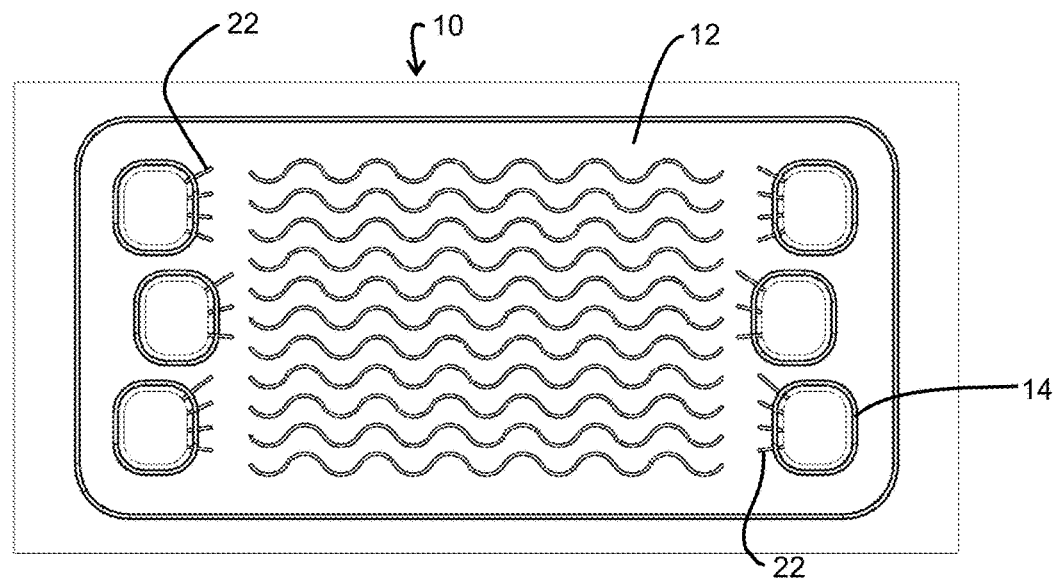
FIG. 4 depicts one variation of a fuel cell assembly.

FIGS. 3 and 4 depict variations of a product including a fuel cell assembly 10 including at least one bipolar plate 12. A raised bead 14 may be defined on or by the bipolar plate 12 and may be generally sinusoidal in shape or may be generally zig-zag in shape (not shown). The bead may include a plurality of crest portions opposite a plurality of trough portions, having a plurality of tangent portions disposed between adjacent crest portions or adjacent trough portions. A plurality of tunnels 22 may be formed within the crest portions, the trough portions, or tangent portions. The fuel cell assembly 10 may be constructed and arranged to reduce contact pressure distribution on the at least one bipolar plate 12 including the bead 14 by defining at least one tunnel 22 defining at least one through hole 24 within the at least one tangent portion.

As an example, bipolar plates having beads with crest and trough portions resembling a sinusoidal curve may have tunnels defining through holes at the crest and trough portions. A fuel cell stack assembly may include multiple bipolar plates with beads having varying contact pressure. Pressure variation on beads with crests and troughs may range from about 4.79 MPa to about 5.80 MPa leading to a range of about 1.01 MPa. Locating tunnels at crest and trough portions lead to large pressure variation at the tunnels ranging from about 5.60 MPa to about 7.66 MPa leading to a range of about 2.06 MPa. Locating tunnels at tangent portions between adjacent crest or trough portions lead to pressure variation at the tunnels ranging from about 6.56 MPa to about 7.66 MPa leading to a range of about 1.34 MPa.

According to variation 1, a product may include at least one bipolar plate may include at least one bead, the bead may include a plurality of crest portions and a plurality of trough portions that may include at least one tangent portion disposed between adjacent crest portions and trough portions; the bipolar plate further may include at least one tunnel defining at least one through hole within the at least one tangent portion.

Variation 2 may include a product as set forth in variation 1 wherein the bead may include a generally sinusoidal curve shape.

Variation 3 may include a product as set forth in variation 1 or 2 wherein the bead may include a generally zig-zag shape.

Variation 4 may include a product as set forth in any of variations 1 through 3 wherein the at least one tunnel may be a plurality of tunnels defining a plurality of through holes within a plurality of tangent portions.

According to variation 5, a product may include a fuel cell assembly may include at least one bipolar plate may include at least one bead, the bead may include a plurality of crest portions and a plurality of trough portions having at least one tangent portion disposed between adjacent crest portions and trough portions; the fuel cell assembly further may include at least one tunnel defining at least one through hole within the at least one tangent portion.

Variation 6 may include a product as set forth in variation 5 wherein the bead may include a generally sinusoidal curve shape.

Variation 7 may include a product as set forth in any of variations 5 through 6 wherein the bead may include a generally zig-zag shape.

Variation 8 may include a product as set forth in any of variations 5 through 7 wherein the at least one tunnel is a plurality of tunnels defining a plurality of through holes within a plurality of tangent portions.

According to variation 9, a method may include providing a fuel cell assembly may include at least one bipolar plate may include at least one bead, the bead may include a plurality of crest portions and a plurality of trough portions having at least one tangent portion disposed between adjacent crest portions and trough portions; and reducing contact pressure distribution on the at least one bipolar plate which may include at least one bead by defining at least one tunnel defining at least one through hole within the at least one tangent portion.

Variation 10 may include a product as set forth in variation 9 wherein the bead may include a generally sinusoidal curve shape.

Variation 11 may include a product as set forth in any of variations 9 through 10 wherein the bead may include a generally zig-zag shape.

Variation 12 may include a product as set forth in any of variations 10 through 11 wherein the at least one tunnel is a plurality of tunnels defining a plurality of through holes within a plurality of tangent portions.

The above description of variations of the invention is merely demonstrative in nature and, thus, variations thereof are not to be regarded as a departure from the spirit and scope of the inventions disclosed within this document.

What is claimed is:

1. A product comprising:
   at least one bipolar plate comprising:
   at least one raised sealing bead projecting orthogonally from a planar surface of the bipolar plate, the raised sealing bead having a compound curved shape comprising a plurality of crest portions and a plurality of trough portions that are defined on the planar surface of the bipolar plate, and at least one raised tangent portion disposed between adjacent crest portions and trough portions; and
   at least one raised tunnel projecting orthogonally from the planar surface of the bipolar plate and disposed on the planar surface orthogonal to the raised sealing bead, the raised tunnel in communication with the at least one raised tangent portion via a through hole projecting orthogonally from the planar surface of the bipolar plate and disposed between the raised sealing bead and the raised tangent portion.

2. A product as set forth in claim 1 wherein the compound curved shape of the raised sealing bead comprises a generally sinusoidal curve shape projecting orthogonally from the planar surface.

3. A product as set forth in claim 1 wherein the compound curved shape of the raised sealing bead comprises a generally zig-zag shape projecting orthogonally from the planar surface.

4. A product as set forth in claim 1 wherein the at least one raised tunnel includes a plurality of raised tunnels defining a plurality of through holes in communication with the plurality of raised tangent portions.

5. A product comprising:
   a fuel cell assembly comprising at least one bipolar plate comprising at least one bipolar plate comprising at least one raised sealing bead projecting orthogonally from a planar surface of the bipolar plate, the raised sealing bead having a compound curved shape comprising a plurality of crest portions and a plurality of trough portions that are defined on the planar surface of the bipolar plate, and at least one raised tangent portion disposed between adjacent crest portions and trough portions; and
   at least one raised tunnel projecting orthogonally from the planar surface of the bipolar plate and disposed on the planar surface orthogonal to the raised sealing bead, the raised tunnel in communication with the at least one raised tangent portion via a through hole projecting orthogonally from the planar surface of the bipolar plate and disposed between the raised sealing bead and the raised tangent portion.

6. A product as set forth in claim 5 wherein the compound curved shape of the raised sealing bead comprises a generally sinusoidal curve shape projecting orthogonally from the planar surface.

7. A product as set forth in claim 5 wherein the compound curved shape of the raised sealing bead comprises a generally zig-zag shape projecting orthogonally from the planar surface.

8. A product as set forth in claim 5 wherein the at least one raised tunnel includes a plurality of raised tunnels defining a plurality of through holes in communication with the plurality of raised tangent portions.

9. A method comprising
   providing a fuel cell assembly comprising at least one bipolar plate comprising at least one raised sealing bead projecting orthogonally from a planar surface of the bipolar plate, the raised bead having a compound curved shape comprising a plurality of crest portions and a plurality of trough portions that are defined on the planar surface of the bipolar plate, and at least one raised tangent portion disposed between adjacent crest portions and trough portions; and
   reducing contact pressure distribution on the comprising at least one bipolar plate comprising at least one bead by defining at least one raised tunnel projecting orthogonally from the planar surface of the bipolar plate and disposed on the planar surface orthogonal to the raised bead, the raised tunnel in communication with the at least one raised tangent portion via a through hole projecting orthogonally from the planar surface of the bipolar plate and disposed between the raised sealing bead and the raised tangent portion.

10. A method as set forth in claim 9 wherein the compound curved shape of the raised sealing bead comprises a generally sinusoidal curve shape projecting orthogonally from the planar surface.

11. A method as set forth in claim 9 wherein the compound curved shape of the raised sealing bead comprises a generally zig-zag shape projecting orthogonally from the planar surface.

12. A method as set forth in claim 9 wherein the at least one tunnel includes a plurality of tunnels defining a plurality of through holes projecting orthogonally from the bipolar surface in communication with the plurality of raised tangent portions.

13. The product as set forth in claim 1, wherein the compound curved shape of the raised sealing bead comprises a generally sinusoidal curve shape projecting orthogonally from the planar surface and wherein the at least one raised tunnel includes a plurality of tunnels defining a plurality of through holes in communication with the raised tangent portions.

14. The product as set forth in claim 1, wherein the compound curved shape of the raised sealing bead comprises a generally zig-zag shape projecting orthogonally from the planar surface and wherein the at least one raised tunnel includes a plurality of raised tunnels defining a plurality of through holes in communication with the plurality of raised tangent portions.

15. The product as set forth in claim 5, wherein the compound curved shape of the raised sealing bead comprises a generally sinusoidal curve shape projecting orthogonally from the planar surface and wherein the at least one raised tunnel includes a plurality of raised tunnels defining a plurality of through holes in communication with the plurality of raised tangent portions.

16. The product as set forth in claim 5, wherein the compound curved shape of the raised sealing bead comprises a generally zig-zag shape projecting orthogonally from the planar surface and wherein the at least one raised tunnel includes a plurality of raised tunnels defining a plurality of through holes in communication with the plurality of raised tangent portions.

17. The method as set forth in claim 9, wherein the compound curved shape of the raised sealing bead comprises a generally sinusoidal curve shape projecting orthogonally from the planar surface and wherein the at least one raised tunnel includes a plurality of raised tunnels defining a plurality of through holes in communication with the plurality of raised tangent portions.

18. The method as set forth in claim 9, wherein the compound curved shape of the raised sealing bead comprises a generally zig-zag shape projecting orthogonally from the planar surface and wherein the at least one raised tunnel includes a plurality of raised tunnels defining a plurality of through holes in communication with the plurality of raised tangent portions.

* * * * *